July 12, 1938. E. G. HILL ET AL. Re. 20,794

CLUTCH OPERATING DEVICE FOR MOTOR VEHICLES

Original Filed Dec. 1, 1931, 2 Sheets-Sheet 1

Inventors
EDWARD G. HILL
HENRY W. HEY

By C. R. Parker Jr.
Attorney

July 12, 1938. E. G. HILL ET AL Re. 20,794

CLUTCH OPERATING DEVICE FOR MOTOR VEHICLES

Original Filed Dec. 1, 1931 2 Sheets-Sheet 2

Inventors
EDWARD G. HILL
HENRY W. HEY

By C. L. Parker Jr.
Attorney

Reissued July 12, 1938

Re. 20,794

UNITED STATES PATENT OFFICE 20,794

CLUTCH OPERATING DEVICE FOR MOTOR VEHICLES

Edward G. Hill and Henry W. Hey, Richmond, Va., assignors to Hill Engineering Corporation, Richmond, Va., a corporation of Virginia Original No. 1,881,188, dated October 4, 1932, Serial No. 578,394, December 1, 1931. Application for reissue January 26, 1934, Serial No. 708,502

27 Claims. (Cl. 192—.01)

Figure 1:
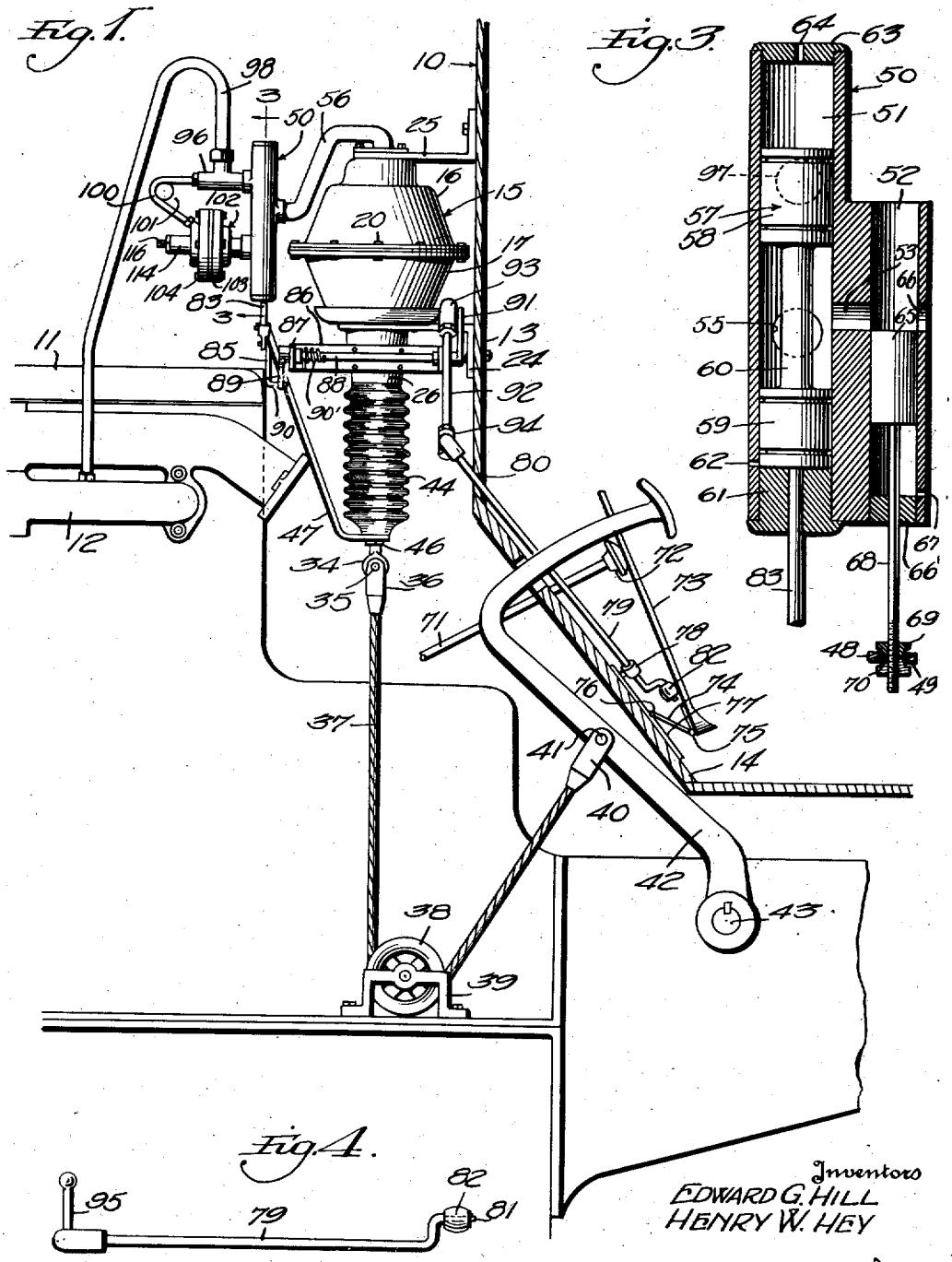

This invention relates to clutch operating devices for motor vehicles.

In the copending applications of Edward G. Hill, Serial Nos. 487,319, filed October 8, 1930, and 537,155 filed May 13, 1931, there are disclosed power mechanisms particularly adapted for use in operating the clutch pedal of a motor vehicle. In the prior constructions referred to, the power device is operable by differential pressure such, for example, as the vacuum of the intake manifold of the motor vehicle engine. The prior constructions provide control means for a motor vehicle clutch whereby the clutch elements are rapidly movable to disengage position but are controlled in their return movement to operative position in accordance with conventional practice wherein the elements of the clutch move relatively rapidly toward each other until they are nearly in engaging position, and then are relatively slowly brought into operative engagement to prevent "grabbing" of the clutch elements.

The device of application Serial No. 487,319 includes a main valve and an auxiliary valve, the former of which is operable by the hand or foot of the operator, while the auxiliary valve is connected to some portion of the power device to be actuated thereby to effect the retarding of the movement of the clutch elements as they approach operative position. The hand or foot member employed for operating the main valve, and which may be termed "the manual control" is operative in one direction from normal position to effect declutching, and is movable in the opposite direction to a point spaced from normal position to arrest movement of the clutch elements at the point where they are about to come into engagement. When the manual control is then moved completely to normal position, or when it is moved continuously from operative to normal position, the movement of the clutch elements into engagement is automatically retarded to a given rate of movement to prevent grabbing of the clutch.

In application Serial No. 537,155 there is disclosed a similar mechanism wherein the "manual control" is in the form of a treadle which is operable for effecting declutching, and which, when released to return to normal position, controls the power device in such a manner that the clutch elements will return rapidly toward engaged position and will have their movement arrested just prior to the point where clutch engagement takes place. Further movement of the treadle beyond normal position will then progressively open the engine throttle and will operate the valve mechanism to permit the clutch elements to return to normal position relatively slowly, the rate of return movement being fixed by a bleed valve.

The present invention is an improvement over the structures of the prior applications referred to inasmuch as it contemplates a normal position toward which the manual control is biased and at which point movement of the clutch elements toward operative position will be completely arrested, and wherein movement of the clutch elements into operation will be determined automatically in accordance with conditions present, i. e., according to the operation of the "manual control" instead of being definitely controlled by a fixed bleed valve.

An important object of the invention is to provide a novel form of control mechanism for a power clutch operating device wherein the clutch elements may be brought into engagement relatively slowly when the vehicle is in low gear, or in reverse gear, and wherein more rapid engagement takes place when the vehicle is in second or high gear, such operation taking place automatically without any attention on the part of the operator other than the usual operation of the motor throttle.

A further object is to provide a device of the character referred to wherein novel means is employed for utilizing the degree of vacuum in the intake manifold for determining the rapidity with which the clutch elements will be brought into actual engagement whereby the operation of shifting gears is greatly facilitated without the use of the clutch pedal, and wherein the shifting of the gears is permitted to take place in a minimum length of time.

A further object is to provide a normally closed vent valve associated with the main valve through which the power device is operated, and to provide means for opening the vent valve to a degree corresponding to the degree of vacuum in the intake manifold to determine the rate of movement of the clutch elements into engagement with each other.

A further object is to provide means operative in accordance with the degree and rapidity of accelerator operation for determining the rapidity with which the clutch elements move into operative engagement with each other whereby proper engagement of the clutch elements will be effected directly in accordance with accelerator action which differs according to whether the operator is driving the vehicle in reverse, or in low, intermediate or high gears.

Other objects and advantages of the invention will become apparent during the course of the following description.

Figure 2:
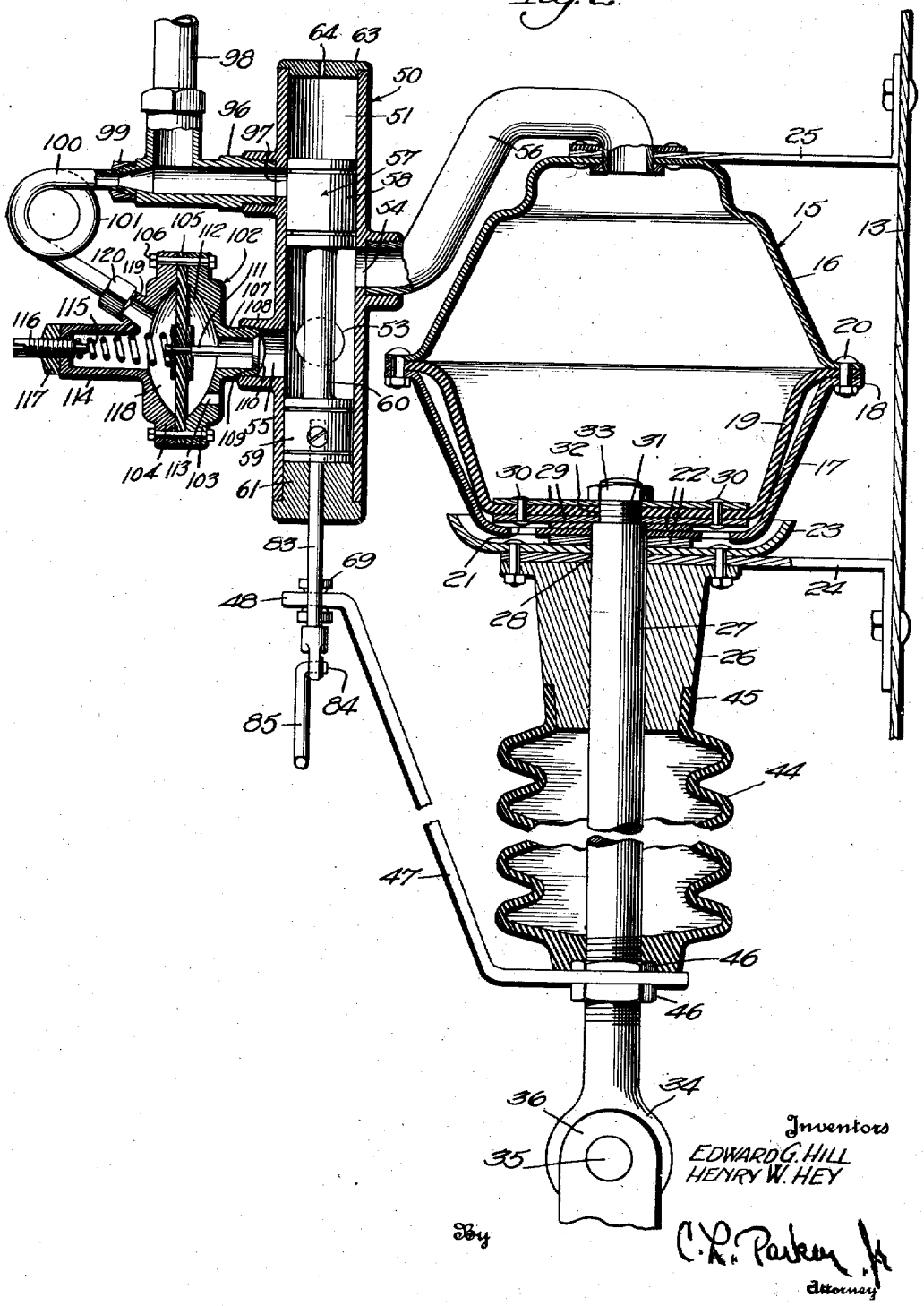

In the drawings we have shown one embodiment of the invention. In this showing,

Figure 1 is a side elevation illustrating the device installed for operation, parts of the vehicle being shown in section, Figure 2 is an enlarged vertical sectional view, parts being shown in elevation and parts being broken away, Figure 3 is an enlarged vertical sectional view through the valve mechanism taken on line 3—3 of Figure 1, and, Figure 4 is a detail view of a crank rod employed for actuating the main control valve.

Referring to Figure 1, the numeral 10 designates the vehicle as a whole having the usual internal combustion engine 11 including an intake manifold 12. The vehicle further includes a dash 13 and floor boards 14, as will be apparent.

The device forming the subject matter of the present invention comprises a power device indicated as a whole by the numeral 15. This device may be of any desired type and is shown in the present instance as being a differential pressure operated diaphragm mechanism. Referring to Figure 2, it will be noted that the power device 15 includes upper and lower complementary casing sections 16 and 17 having their adjacent edges turned outwardly to form parallel flanges 18 between which is mounted the edge portion of a diaphragm 19. Bolts 20 secure together the flanges 18 and the edge portions of the diaphragm 19.

The bottom of the diaphragm casing section 17 is provided with vent openings 21 communicating with the atmosphere. Disks 22 are secured against opposite sides of the bottom of the casing section 17, and a cup 23 is secured against the bottom disk 22 whereby it is spaced away from the casing section 17 to permit the vent openings 21 to communicate with the atmosphere. The cup 23 and the top of the upper casing section 16 are secured to the dash 13 by brackets 24 and 25.

A bearing 26 is arranged in axial alinement with the casing sections 16 and 17 and a vertical shaft 27 is slidable therein. The upper end of the shaft extends through suitable openings 28 in the bracket 24, cup 23, disks 22 and the casing section 17. The diaphragm 19 is provided on opposite sides of the central portion thereof with disks 29 secured to each other and to the diaphragm by rivets or other fastening elements 30. The upper end of the shaft 27 is reduced and threaded as at 31 and extends through alined axial openings 32 formed in the diaphragm and in the disks 29. A nut 33 is threaded on the upper end of the reduced portion of the shaft, as clearly shown in Figure 2.

The shaft 27 extends downwardly below the bearing 26 a substantial distance and is provided at its lower end with an eye 34. This eye is connected by a bolt or pin 35 to a yoke 36 connected to one end of a cable 37. The cable passes around a pulley 38 journalled in a suitable bracket 39 supported by a suitable fixed part of the vehicle, such as the side frame thereof. The other end of the cable is provided with a yoke 40 connected by a pin or bolt 41 to the clutch pedal 42 of the vehicle. This pedal is connected to the usual shaft 43 which operates a conventional clutch (not shown).

The shaft 27 is protected against dirt and other foreign material by a longitudinally expansible and contractible sleeve 44, formed of rubber or the like and having its upper end 45 surrounding the bearing 26. The lower end of the sleeve is arranged over the upper of a pair of nuts 46 to be supported thereby. The sleeve 44 is sufficiently long to permit full vertical movement of the shaft 27. An arm 47 has one end surrounding the shaft 27 and clamped thereto by the nuts 46. This arm extends upwardly and thence outwardly in a horizontal end 48 having an opening 49 therein for a purpose to be described.

Referring to Figures 2 and 3, the numeral 50 designates a valve chest as a whole which may be cast integral and provided with a pair of parallel valve chambers 51 and 52 communicating with each other through a port 53. The valve chamber 50 is provided on opposite sides thereof with a pair of ports 54 and 55 which are longitudinally offset from each other and the port 54 communicates with the interior of the upper diaphragm casing section 16 through a pipe or conduit 56. A valve indicated as a whole by the numeral 57 is arranged in the chamber 51 and comprises spaced valve heads 58 and 59 connected by a reduced stem 60. The valve 57 is shown in its normal position in Figure 3 with its lower end resting upon a head 61 closing the lower end of the valve chamber 51. Just above the head 61, the chamber 51 is preferably vented as at 62 to prevent the accumulation of pressure in the bottom of the chamber as the valve 57 moves downwardly. The upper end of the valve chamber 51 is closed by a cap 63 vented to the atmosphere as at 64.

A slide valve 65 is arranged in the valve chamber 52 and normally occupies the position shown in Figure 3, just below the port 53. In a manner to be described, the valve 65 is adapted to be moved to a position wholly above the port 53, in which case the latter communicates with the atmosphere through a port 66 extending through the wall of the chamber 52 preferably at a point diametrically opposite the port 53. A head 66' is arranged in the lower end of the chamber 52, while the latter, just above the head 66', is vented to the atmosphere as at 67. An operating stem 68 is secured at its upper end to the valve 65 and extends through a suitable opening in the head or plug 66'. A substantial distance beneath the valve body, the stem 68 is provided with a pair of nuts 69 having reduced adjacent portions 70 adapted to clamp against each other through the opening 49 in the upper end 48 of the arm 47.

Referring to Figure 1, the numeral 71 designates the throttle operating rod of the vehicle provided at its upper end with a button 72. This button is adapted to be actuated by a special novel form of treadle 73 which forms, per se, no part of the present invention. The forward end of the treadle rests upon the button 72 and the button is adapted to be actuated by the treadle upon depression thereof, as will be apparent. The treadle is connected at its lower end to a novel form of hinge mounting 74, one end of the hinge being pivotally connected as at 75 to the lower end of the treadle, while the forward end of the hinge is pivoted as at 76 to a plate 77 secured against the floor board 14.

The plate 77 carries a small bearing 78 swiveled thereto and rotatably supporting a crank rod 79. The other end of this rod extends through an opening 80 formed in the dash 13. The swivel mounting of the bearing 78 is provided for the reason that installations of the device on different motor vehicles require that the rod 79 be arranged at different angles, which condition is taken care of by the swivel mounting of the bearing 78. The rod 79 is provided at one end with an offset crank arm 81 carrying a substantially spherical roller 82 which contacts with the bottom of the treadle 73 near the rear end thereof, as shown in Figure 1.

The lower valve member 59 is connected to the upper end of a valve stem 83 which extends downwardly through a suitable opening in the head 61. The lower end of the stem 83 is pivotally connected to one end 84 of a link 85. A bracket 86 is secured to the bearing 26 and has its arms 87 turned outwardly to form bearings supporting a rock shaft 88. This rock shaft has a crank 89 at one end pivotally connected to the other end 90 of the link 85, as shown in Figure 1. A spring 90' tends to turn the shaft 88 in one direction.

The other end of the rock shaft 88 is provided with a crank 91 connected by a ball and socket to the upper end of a link 92. The ball and socket may be of any conventional type and is illustrated as a whole by the numeral 93. A similar ball and socket connection 94 is provided between the lower end of the link 92 and a crank 95 carried by the rod 79. It will be apparent that when the roller 82 is depressed a rocking motion will be transmitted to the rod 79, thus moving the crank 95 and link 92 downwardly. This movement is transmitted to the shaft 88 by downward movement of the crank 91, and this movement swings the crank 89 upwardly thus elevating the valve stem 83 and valve 57, through the link 85. The operation which takes place upon elevation of the valve 57 will be later referred to in detail.

A T connection 96 is connected to the valve body 50 to communicate with the chamber 51, under certain conditions, through a port 97. The branch of the T is connected to one end of a pipe 98, and the opposite end of this pipe is connected to the intake manifold 12 as shown in Figure 1. The other end of the run of the T 96 is connected by a union 99 to one end of a pipe 100. This pipe is coiled intermediate its ends as at 101 for convenience in applying the ends of the pipe to its two connections.

A diaphragm housing 102 is arranged adjacent the valve body 50 and comprises complementary sections 103 and 104 having annular flange portions engaging against opposite sides of a flexible diaphragm 105. The sections 103 and 104 are secured against opposite sides of the diaphragm 105 by bolts 106. The section 103 is provided with an axial projection 107 threaded in a boss 108 extending from the valve body 50 and defining the port 55 previously described. The axial projection 107 is provided in its end with a valve seat 109, as shown in Figure 2. This seat is engaged by a valve 110 carried by a stem 111 connected to the diaphragm 105 substantially axially thereof. The casing section 103, together with the diaphragm 105, defines a chamber 112 communicating with the atmosphere through a port 113.

The casing section 104 is provided with an axial extension 114 in which is arranged a spring 115 operating at one end against the diaphragm 105 tending to move the valve 110 from its seat. The other end of the spring contacts with an adjusting screw 116 which is secured in adjusted positions by a lock nut 117. The casing 104 defines with the diaphragm a chamber 118. This chamber has an angularly extended boss 119 to which the other end of the pipe 100 is connected by a union 120. Since the pipe 98 is connected to the intake manifold, it will be apparent that the depression therein will be communicated to the chamber 118, whereby atmospheric pressure in the chamber 112 tends to move the diaphragm 105 outwardly to seat the valve 110.

The operation of the device is as follows:

It will be apparent that the shaft or rod 79 may be rocked about its axis by depression of the lower end of the treadle 73, this movement causing the roller 82 to be moved downwardly. This action, however, is in no way dependent upon the position of the motor throttle, since it will be apparent that the upper end of the treadle 73 may be moved back and forth to cause the throttle rod 71 to travel throughout its range of movement without affecting the rod 79. Under normal operating conditions, therefore, the throttle is subject to complete control throughout its range of movement without the clutch being affected in any way in accordance with throttle position.

When it is desired to shift the gears of the motor vehicle, the rear or lower end of the treadle 73 is depressed, usually with the upper end of the treadle released whereby the motor throttle will be in idling position. Assuming that the vehicle is being started from a standstill with the gear shift lever in neutral position, and with the engine running, the operator depresses the lower end of the pedal 73 by pressure of the heel, and this action rocks the shaft 79, thus transmitting upward movement to the valve 57 in the manner previously described, through the rocking of the shaft 88 and the operation of the parts connected thereto. When the valve 57 is moved upwardly, the lower head 59 moves across and closes the ports 53 and 55, and stops below the port 54. At the same time, the upper head 58 opens the port 97, and thus communication will be established between the ports 54 and 97 around the stem 60. Accordingly, the upper casing section 16 will be placed in communication with the intake manifold through the conduit 56, through the valve mechanism, and thence through the T 96 and pipe 98. Under such conditions, atmospheric pressure beneath the diaphragm 19 effects upward movement thereof, which movement is transmitted through the shaft 27 to the cable 37. This movement of the cable is transmitted in turn to the clutch pedal 42 and thus this pedal is moved to depressed position to disengage the clutch elements.

The valve 65 normally occupies the position shown in Figure 3 whereby the port 53 is in communication with the atmosphere through the open upper end of the chamber 52 and through the port 65. When the shaft 27 is moved upwardly under the influence of differential pressure in the power device in the manner referred to, the valve 65 also will be moved upwardly through its connection with the arm 47, which is connected to the shaft 27 as shown in Figures 1 and 2. When the valve 65 reaches its upper limit of movement, the bottom of the valve clears the ports 53 and 66, and accordingly the port 53 will be in communication with the atmosphere. At this time, however, the port 53 will be cut off from communication with the valve chamber 51 since the port 53 will be closed by the lower valve head 59.

With the clutch disengaged in the manner referred to, the operator shifts into low gear and then releases the lower end of the treadle 73 and slowly depresses the forward end thereof. Independently of the depression of the forward end of the treadle, the releasing of the lower end of the treadle causes the return of the valve 57 to normal position by virtue of the action of the spring 90'. When the valve 57 thus returns to normal position, it uncovers the port 53, and this port having been placed in communication with the atmosphere when the valve 65 reached its upper position, it will be apparent that the port 54 will communicate with the atmosphere through ports 53 and 66. This action causes air to rush into the upper casing section 16 thus partially reducing the differential pressure on opposite sides of the diaphragm 19, whereupon the diaphragm will start to move downwardly quite rapidly due to the action of the usual clutch spring and the fact that the pressure differential is substantially reduced.

As the shaft 27 moves downwardly with the diaphragm 19, the valve 65 moves across the ports 53 and 66, thus cutting off communication between the atmosphere and the interior of the upper casing section 16, and continued downward movement of the diaphragm 19 and associated elements causes a sufficient differential pressure to be recreated on opposite sides of the diaphragm 19 to arrest further downward movement of this element. The nuts 69 are readily adjustable along the stem 68 to determine the point at which downward movement of the diaphragm will be arrested, and thus it is relatively easy to arrest movement of the clutch elements toward each other as they approach a point where they are about to come into engagement with each other. With the valve 57 thus arranged in normal position, as shown in Figure 2, and with the valve 65 arranged in an intermediate position entirely closing the port 53, it will be apparent that the diaphragm will remain motionless until some further act takes place to permit it to move downwardly whereby the clutch elements come into engagement with each other. Unless such further action is performed, the clutch elements will remain in their arrested position for an indefinite length of time provided there is no substantial leakage past the various valve members referred to.

In connection with the foregoing operation, attention is invited to the fact that regardless of the position of the valve 57, the chamber 118 is in constant communication with the intake manifold, and the differential pressure on opposite sides of the diaphragm 105 is normally greater than the compressive force of the spring 115 acting against the diaphragm 105, and accordingly the valve 110 will be held in closed position. As previously stated, it is being assumed that the operator has started from a standstill and has placed the gear shift lever in low gear and as is well known, the clutch of a motor vehicle is released quite slowly when in low gear while the accelerator pedal is gradually depressed. Such conventional operation of a motor vehicle is simulated perfectly with the present apparatus.

When the operation of the apparatus has been carried to the point previously described with the gear shift lever in low gear position and the clutch elements about to come into engagement with each other, the upper end of the treadle 73 is slowly depressed, thus slowly moving the throttle rod 71 and gradually opening the throttle. This action causes a gradual increase in the pressure in the intake manifold and thus the pressure differential on opposite sides of the diaphragm 105 will be slightly reduced, but this increase will be sufficient to permit the spring 115 to overcome the differential pressure referred to, thus slightly unseating the valve 110. Air at atmospheric pressure then enters the port 113, passes the valve 110, and then flows through port 55, through the valve chamber 51, around the stem 60, through port 54 and conduit 56 into the upper casing section 16. This action takes place relatively gradually to bleed air into the space above the diaphragm 19, and accordingly this member will move downwardly relatively slowly and the clutch elements will be brought into gradual engagement with each other.

The continuation of this action gradually speeds up the motor and brings the clutch elements into full engagement, and when the proper vehicle speed has been reached, the operator is ready to shift into second gear. This operation is accomplished by preferably releasing the upper end of the treadle 73 to permit the motor to return to idling speed, and by depressing the lower end of the treadle to effect upward movement of the diaphragm 19 in the manner previously described. With the clutch thus placed in inoperative condition, the gear shift lever is moved into second gear, whereupon the lower end of the treadle is released and the upper end is pressed downwardly and forwardly to increase the engine speed. As is well known, the clutch elements of a motor vehicle may be brought into engagement with each other more rapidly when the vehicle is in second gear, due to its momentum, than when it is in low gear, and accordingly the operator may more rapidly depress the upper end of the treadle 73 in accordance with conventional practice. This action repeats the operation as previously described wherein the valve 110 is unseated to bleed air into the upper casing section 16 to permit the clutch elements to come into engagement after their movement has been previously arrested in the manner described, except that a more rapid opening of the throttle causes a greater increase in the pressure of the intake manifold, and thus more greatly decreasing the pressure differential on opposite sides of the diaphragm 105. The spring 115 accordingly opens the valve 110 to a greater extent than under the condition previously described, and thus the clutch elements will be brought more rapidly into engagement with each other due to the increased rate of flow of air into the upper casing section 16.

The actions previously described are repeated when going into high gear, except that the clutch elements may be brought into engagement even more rapidly in high gear than in second gear, and accordingly the throttle may be depressed more rapidly than under the previously described conditions thus permitting the clutch elements to come into engagement with each other relatively rapidly. The rate of movement of the clutch elements into engagement after their movement is arrested is not fixed in any case but is dependent upon the pressure in the intake manifold, and this pressure, or in other words, the degree of depression in the manifold, is directly dependent upon the speed with which the throttle of the motor is opened when the engine is idling, as is the case in shifting gears. Accordingly the operator may go through the various functions of shifting gears at least as rapidly as can be done in accordance with conventional practice and individual drivers are permitted to act in accordance with their individual desires in the matter of the rapidity with which they pass through the various steps of shifting gears. The rapid movement of the clutch elements up to the point where their movement is arrested just prior to clutch engagement materially reduces the time necessary for passing through the various gears.

The use of the diaphragm 105 and associated elements provides extreme flexibility in operation since the speed with which the clutch elements are brought into engagement is not limited at any time except by the speed of operation of the throttle in proportion to the engine speed. The use of this feature of the invention eliminates the necessity of controlling the speed of engagement of the clutch elements in accordance with the position of the gear shift lever and gears, and provides substantially unlimited flexibility which cannot be obtained when the speed of engagement of the clutch elements is controlled definitely in accordance with the positions of the transmission gears or in accordance with the operation of the accelerator without regard to engine speeds. In practice it has been found that accuracy of adjustment can be so perfectly obtained that smoother starting is accomplished than is possible with conventional operation, especially in the case of more or less inexperienced drivers.

The use of the apparatus also permits the practice of "free wheeling" wholly under the control of the operator. For example, when it is desired to disengage the motor from the driving wheels while the vehicle is under way, it merely is necessary to depress the lower end of the treadle 73 and substantially simultaneously release the upper end of the treadle, whereupon the clutch will be disconnected and the engine permitted to idle until such time as reengagement of the clutch is desired. The clutch elements may be reengaged merely by releasing the lower end of the treadle 73 and depressing the upper end of the treadle, whereupon the clutch elements will be released for complete engagement, and this action readily may be practiced without any particular exercise of skill on the part of the operator.

Wherever the expression "normal position" or a similar expression occurs in the specification and claims, such expression is intended to indicate the position to which an element is constantly biased, that is, a position to which an element will move in the absence of a specially applied force. For example, the "normal position" of the valve 57 is its lowermost position in Figure 2, since this valve will move to such position under the influence of the spring 90' in the absence of a force specially applied to the lower end of the treadle 73.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. Apparatus of the character described comprising a power device connected to an operating member of a motor vehicle clutch, control means operable for rendering said power device operative to move the clutch to inoperative position and for releasing the clutch elements for movement toward operative position, means operative as the clutch elements approach operative position for arresting the movement of such elements, and means for controlling the rate of movement of the clutch elements into engagement with each other in accordance with the rate of operation of the throttle of the motor vehicle engine in proportion to the engine speed.

2. Apparatus of the character described comprising a power device connected to an operating member of a motor vehicle clutch, control means operable for rendering said power device operative to move the clutch to inoperative position and for releasing the clutch elements for movement toward operative position, means automatically operative as the clutch elements approach operative position for arresting the movement of such elements, control means for causing retarded movement of the clutch elements into engagement with each other, and means controlled by the rate of operation of the throttle of the motor vehicle engine in proportion to the engine speed for controlling the rate of movement of the clutch elements into engagement with each other through said last named means.

3. Apparatus of the character described comprising a power device connected to an operating member of a motor vehicle clutch, control means operable for rendering said power device operative to move the clutch to inoperative position and for releasing the clutch elements for movement toward operative position, means operative as the clutch elements approach operative position for arresting the movement of such elements, and means for controlling the rate of movement of the clutch elements into engagement with each other in accordance with pressure present in the intake manifold of the motor vehicle engine whereby clutch element engagement takes place with increased rapidity upon the increase in pressure in the intake manifold.

4. Apparatus of the character described comprising a power device connected to an operating member of a motor vehicle clutch, control means operable for rendering said power device operative to move the clutch to inoperative position and for releasing the clutch elements for movement toward operative position, means automatically operative as the clutch elements approach operative position for arresting the movement of such elements, control means for causing retarded movement of the clutch elements into engagement with each other, and means for controlling said last named means for determining the rate of movement of the clutch elements into engagement with each other in accordance with pressure present in the intake manifold of the motor vehicle engine whereby clutch element engagement takes place with increased rapidity upon the increase in pressure in the intake manifold.

5. Apparatus of the character described comprising a differential pressure power device having a movable member connected to an operating member of a motor vehicle clutch, a control device movable for establishing pressure differential in said power device to move the clutch elements to inoperative position, said control device being normally operative to establish pressure equalization in said power device, means automatically operative as the clutch elements reach approximately the point of initial engagement for arresting the movement of such elements, and a valve for controlling the rate of movement of the clutch elements into operative engagement in accordance with the rate of operation of the throttle of the vehicle engine in proportion to the engine speed.

6. Apparatus of the character described comprising a power device operable by differential pressure and having a movable member connected to a motor vehicle clutch having a normal bias to operative position, valve mechanism normally establishing pressure equalization in said power device and operable for establishing differential pressure therein, a control device for actuating a portion of the valve mechanism to render it operative and releasable to permit it to become inoperative, said valve mechanism including automatic means operative upon the release of the control device for arresting the movement of the clutch elements as they approach operative position, and means for establishing pressure equalization in said power device at a retarded rate to retard the movement of the clutch elements into engagement with each other in accordance with the rate of operation of the throttle of the motor vehicle engine in proportion to the engine speed.

7. Apparatus of the character described comprising a power device operable by differential pressure and having a movable member connected to a motor vehicle clutch having a normal bias to operative position, valve mechanism normally establishing pressure equalization in said power device and operable for establishing differential pressure therein, a control device for actuating a portion of the valve mechanism to render it operative and releasable to permit it to become inoperative, said valve mechanism including automatic means operative upon the release of the control device for arresting movement of the clutch elements as they approach operative position, control means for causing retarded movement of the clutch elements into engagement with each other, and means controlled by the rate of operation of the throttle in proportion to the engine speed and operative through said last named means for controlling the rate of movement of the clutch elements into engagement with each other.

8. Apparatus of the character described comprising a power device operable by differential pressure and having a movable member connected to a motor vehicle clutch having a normal bias to operative position, valve mechanism normally establishing pressure equalization in said power device and operable for establishing differential pressure therein, a control device for actuating a portion of the valve mechanism to render it operative and releasable to permit it to become inoperative, said valve mechanism including automatic means operative upon the release of the control device for arresting movement of the clutch elements as they approach operative position, control means for causing retarded movement of the clutch elements into engagement with each other by relatively slowly establishing pressure equalization in said power device, and means controlled by the rate of operation of the throttle in proportion to the engine speed and operative through said last named means for determining the rate of establishing pressure equalization in said power device.

9. Apparatus of the character described comprising a power device operable by differential pressure and having a movable member connected to a motor vehicle clutch having a normal bias to operative position, valve mechanism normally establishing pressure equalization in said power device and operable for establishing differential pressure therein, a control device for actuating a portion of the valve mechanism to render it operative and releasable to permit it to become inoperative, said valve mechanism including automatic means operative upon the release of the control device for arresting the movement of the clutch elements as they approach operative position, and means for relatively slowly establishing pressure equalization in said power device to retard the movement of the clutch elements into engagement with each other at a rate substantially in accordance with the increase in pressure in the intake manifold of the vehicle engine.

10. Apparatus of the character described comprising a power device operable by differential pressure and having a movable member connected to a motor vehicle clutch having a normal bias to operative position, valve mechanism normally establishing pressure equalization in said power device and operable for establishing differential pressure therein, a control device for actuating a portion of the valve mechanism to render it operative and releasable to permit it to become inoperative, said valve mechanism including automatic means operative upon the release of the control device for arresting the movement of the clutch elements as they approach operative position, a control valve operative for effecting relatively slow pressure equalization in said power device to retard the movement of the clutch elements into engagement with each other, and means for governing said control valve in accordance with pressure in the intake manifold.

11. Apparatus of the character described comprising a differential pressure power device having a movable member connected to a motor vehicle clutch having a normal bias to operative position, said power device having chambers on opposite sides of said movable member one of which is in constant communication with the atmosphere and the other of which comprises a suction chamber adapted for communication with a source of reduced pressure, valve mechanism normally affording communication between said suction chamber and the atmosphere and operable for connecting said suction chamber to the reduced pressure source, said valve mechanism including automatic means operative when the valve mechanism returns to normal position for arresting the movement of the clutch elements as they approach operative position by closing the normal communication between the suction chamber and the atmosphere, a normally closed valve adapted to be opened to connect the suction chamber to the atmosphere, and control means for said valve operable for effecting movement thereof in accordance with the rate of operation of the engine throttle in proportion to the engine speed.

12. Apparatus of the character described comprising a differential pressure power device having a movable member connected to a motor vehicle clutch having a normal bias to operative position, said power device having chambers on opposite sides of said movable member one of which is in constant communication with the atmosphere and the other of which comprises a suction chamber, valve mechanism normally affording communication between said suction chamber and the atmosphere and operable for connecting said suction chamber to the intake manifold of the vehicle engine, said valve mechanism including automatic means operative when the valve mechanism returns to normal position for arresting the movement of the clutch elements as they approach operative position by closing the normal communication between the suction chamber and the atmosphere, a valve adapted to afford communication between the suction chamber and the atmosphere, resilient means normally tending to open said valve, and control means for said valve including a suction line communicating with the intake manifold and normally operative by the differential pressure created by the suction therein for retaining said valve closed, said resilient means being of a tension adapted to overcome the closing effect of the differential pressure on said valve upon an increase in pressure in the intake manifold.

13. Apparatus constructed in accordance with claim 12 wherein the control means for said valve further comprises a diaphragm having one side in communication with the atmosphere and the other side in communication with the suction line whereby the pressure of the atmosphere normally retains the valve in closed position against the tension of said resilient means.

14. The combination with a motor vehicle engine and a clutch therefor provided with an operating member and having a normal bias to operative position, of a power device connected to the clutch operating member, control means operable for rendering said power device operative to move the clutch to inoperative position and for releasing the clutch elements for movement toward operative position, means operative as the clutch elements approach operative position for arresting the movement of such elements, and means for controlling the rate of movement of the clutch elements into engagement with each other in accordance with the rate of operation of the throttle of the motor vehicle engine in proportion to the engine speed.

15. The combination with a motor vehicle engine and a clutch therefor provided with an operating member and having a normal bias to operative position, of a power device connected to the clutch operating member, control means operable for rendering said power device operative to move the clutch to inoperative position and for releasing the clutch elements for movement toward operative position, means automatically operative as the clutch elements approach operative position for arresting the movement of such elements, control means for causing retarded movement of the clutch elements into engagement with each other, and means controlled by the rate of operation of the throttle of the motor vehicle engine in proportion to the engine speed for controlling the rate of movement of the clutch elements into engagement with each other through said last named means.

16. The combination with a motor vehicle engine and a clutch therefor provided with an operating member and having a normal bias to operative position, of a power device connected to the clutch operating member, control means operable for rendering said power device operative to move the clutch to inoperative position and for releasing the clutch elements for movement toward operative position, means operative as the clutch elements approach operative position for arresting the movement of such elements, and means for controlling the rate of movement of the clutch elements into engagement with each other in accordance with pressure present in the intake manifold of the motor vehicle engine whereby clutch element engagement takes place with increased rapidity upon the increase in pressure in the intake manifold.

17. The combination with a motor vehicle engine and a clutch therefor provided with an operating member and having a normal bias to operative position, of a power device connected to the clutch operating member, control means operable for rendering said power device operative to move the clutch to inoperative position and for releasing the clutch elements for movement toward operative position, means automatically operative as the clutch elements approach operative position for arresting the movement of such elements, control means for causing retarded movement of the clutch elements into engagement with each other, and means for controlling said last named means for determining the rate of movement of the clutch elements into engagement with each other in accordance with pressure present in the intake manifold of the motor vehicle engine whereby clutch element engagement takes place with increased rapidity upon the increase in pressure in the intake manifold.

18. In an automotive vehicle provided with a drive shaft and an internal-combustion engine having an intake manifold and further provided with a clutch for controlling the connection between the engine and drive shaft, power means for operating said clutch, and means for completely controlling the clutch engaging function of said clutch operating means during the portion of the movement of the clutch in which engagement of the clutch elements takes place, said controlling means being automatically operable with changes in the degree of gaseous pressure within said manifold and to a degree which is in direct proportion to said changes to thereby control the rate of clutch engagement.

19. In an automotive vehicle provided with a drive shaft and an internal-combustion engine having an intake manifold and further provided with a clutch for controlling the connection between the engine and drive shaft, vacuum operated means for operating said clutch, and valve means for completely controlling the clutch engaging function of said clutch operating means during the portion of the movement of the clutch in which engagement of the clutch elements takes place, said valve means being automatically operable with changes in the degree of gaseous pressure within said manifold and to a degree which is in direct proportion to said changes to thereby control the rate of clutch engagement.

20. In an automotive vehicle provided with a drive shaft and an internal-combustion engine having an intake manifold and further provided with a clutch for controlling the connection between the engine and drive shaft, vacuum operated means for operating said clutch, and valve means for completely controlling the clutch engaging function of said clutch operating means during the portion of the movement of the clutch in which engagement of the clutch elements takes place, said valve means being automatically operable with changes in the degree of gaseous pressure within said manifold and to a degree which is in direct proportion to said changes to thereby control the rate of clutch engagement, said valve means comprising a movable part operable by differentials of pressure caused by said changes in manifold pressure.

21. In apparatus of the class described, a fluid pressure power device including means responsive to differential pressure connected to the operating member of a motor vehicle clutch having a normal bias to operative or engaged position, and control means for said power device, including valve means for controlling communication between said device and a source of fluid pressure and between said device and the atmosphere and operative as the clutch elements approach operative position for arresting the movement of such elements, and differential pressure operated means independent of said valve means.

22. A clutch operating mechanism for an automotive vehicle provided with an internal combustion engine having an intake manifold and further provided with a clutch, said operating mechanism comprising a vacuum-operated fluid motor and control valve mechanism for said motor including means operative as the clutch elements approach operative position for arresting the movement of such elements, and means, connected to said motor and manifold, for controlling the clutch engaging function of said motor, said last named means being operable in accordance with the degree of manifold vacuum.

23. In a pressure differential operated clutch control device for motor vehicles, a power actuator including cooperable elements, one of which is movable relative to the other, means for connecting one of said elements to a clutch to be operated, and means for controlling the differentials of pressure within said motor to effect the disengaging and engagement of the clutch in such fashion as to simulate a conventional manual operation of the clutch, said means comprising valvular means operative to effect a relatively high rate of change of differentials during the first stage of clutch engagement and then to arrest the movement of the clutch elements, and to effect a relatively low rate of change of differentials during the last stage of clutch engagement, the differentials during said last stage being determined in accordance with the mode of operation of the engine throttle.

24. In clutch operating mechanism for automobiles, a source of vacuum, a differential pressure operated mechanism including a pressure responsive member, said mechanism being provided with means for vacuum connection and for air relief, and means for controlling the air relief associated with said differential pressure operated mechanism to afford relatively unrestricted relief during the first part of the stroke of said member and to arrest the motion of said member when the clutch elements are in a position between disengaged and fully engaged positions, said controlling means including a diaphragm valve, and resilient means for biasing the valve, said diaphragm being subjected to differential pressure.

25. In an automotive vehicle provided with a drive shaft and an internal combustion engine having an intake manifold and further provided with a clutch for controlling the connection between the engine and the drive shaft, power means for operating the clutch, and control means automatically operable with changes in the degree of gaseous pressure within said manifold and to a degree which is in direct proportion to said changes for completely controlling the rate of engagement of the clutch elements.

26. In an automotive vehicle provided with a drive shaft and an internal combustion engine having an intake manifold and further provided with a clutch for controlling the connection between the engine and drive shaft, vacuum operated means for operating said clutch, and valve means automatically operable with changes in the degree of gaseous pressure within said manifold and to a degree which is in direct proportion to said changes for completely controlling the rate of engagement of the clutch elements.

27. In an automotive vehicle provided with a drive shaft and an internal combustion engine having an intake manifold and further provided with a clutch for controlling the connection between the engine and drive shaft, vacuum operated means for operating said clutch, and valve means automatically operable with changes in the degree of gaseous pressure within said manifold and to a degree which is in direct proportion to said changes for completely controlling the rate of engagement of the clutch elements, said valve means comprising a movable part operable by differentials of pressure caused by said changes in manifold pressure.

EDWARD G. HILL.
HENRY W. HEY.